(12) United States Patent
Sasaki

(10) Patent No.: US 10,365,873 B2
(45) Date of Patent: Jul. 30, 2019

(54) INFORMATION PROCESSING SYSTEM, IMAGE FORMING APPARATUS, AND INFORMATION PROCESSING METHOD

(71) Applicant: KYOCERA DOCUMENT SOLUTIONS INC., Osaka (JP)

(72) Inventor: Hideyuki Sasaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/142,855

(22) Filed: Sep. 26, 2018

(65) Prior Publication Data

US 2019/0095162 A1   Mar. 28, 2019

(30) Foreign Application Priority Data

Sep. 28, 2017 (JP) .................. 2017-187638

(51) Int. Cl.
*G06F 3/12* (2006.01)
*H04L 29/08* (2006.01)
*H04N 1/00* (2006.01)

(52) U.S. Cl.
CPC .......... *G06F 3/1297* (2013.01); *G06F 3/1206* (2013.01); *G06F 3/1224* (2013.01); *H04L 67/02* (2013.01); *H04L 67/34* (2013.01); *H04N 1/0044* (2013.01); *G06F 3/1289* (2013.01)

(58) Field of Classification Search
CPC .... G06F 3/1297; G06F 3/1206; G06F 3/1224; G06F 3/1289; H04L 67/02; H04L 67/34; H04N 1/0044

USPC .................................................. 358/1.1–1.18
See application file for complete search history.

(56) References Cited

U.S. PATENT DOCUMENTS

| 7,480,698 | B2 * | 1/2009 | Potter | H04L 29/06 709/217 |
| 8,559,427 | B2 * | 10/2013 | Shah | H04L 12/4625 370/390 |
| 2009/0198811 | A1 * | 8/2009 | Yasui | H04L 41/0213 709/223 |
| 2012/0314245 | A1 * | 12/2012 | Nakashima | H04N 1/00244 358/1.15 |
| 2017/0149835 | A1 * | 5/2017 | Mitevski | H04L 63/108 |

FOREIGN PATENT DOCUMENTS

JP      2011055075 A      3/2011

\* cited by examiner

*Primary Examiner* — Gabriel I Garcia
(74) *Attorney, Agent, or Firm* — Li & Cai Intellectual Property (USA) Office

(57) ABSTRACT

An image forming apparatus includes: a Web server; and a Web browser, the Web browser including a first communication device communicable with the Web server, and a Web browser module, the Web browser module including a full-screen display interface that sends an HTTP request to the Web server, the HTTP request specifying a first format with a parameter, and displays a full-screen of a browser screen in response to a received HTTP response of the first format, and a dynamic-updated part updating interface that sends an HTTP request to the Web server, the HTTP request specifying a second format with a parameter, and dynamically updates at least a part of the browser screen based on a received HTTP response of the second format.

5 Claims, 6 Drawing Sheets

INFORMATION PROCESSING SYSTEM, IMAGE FORMING APPARATUS, AND INFORMATION PROCESSING METHOD

CROSS REFERENCE TO RELATED APPLICATION

This application claims the benefit of Japanese Priority Patent Application JP 2017-187638 filed Sep. 28, 2017, the entire contents of which are incorporated herein by reference.

BACKGROUND OF THE INVENTION

1. Field of the Invention

The present disclosure relates to an information processing system that executes a Web application, an image forming apparatus, and an information processing method.

2. Description of Related Art

There is known a Web application in which a Web server and a Web browser cooperate to systematize a job.

For example, there is known a Web application of an image forming apparatus (MFP, Multifunction Peripheral) including a Web server and a Web browser.

SUMMARY OF THE INVENTION

According to an embodiment of the present disclosure, there is provided an information processing system, including:
  a Web server; and
  a Web browser connected to the Web server via a network,
  the Web browser including
    a first communication device communicable with the Web server, and
    a Web browser module,
  the Web browser module including
    a full-screen display interface that sends an HTTP request to the Web server, the HTTP request specifying a first format with a parameter, and displays a full-screen of a browser screen in response to a received HTTP response of the first format, and
    a dynamic-updated part updating interface that sends an HTTP request to the Web server, the HTTP request specifying a second format with a parameter, and dynamically updates at least a part of the browser screen based on a received HTTP response of the second format,
  the Web server including
    a second communication device communicable with the Web browser,
    a full-screen display data generating module,
    a determining module,
    a data converting module,
    a template module,
    an HTML generating module, and
    a Web server module, in which
  the full-screen display data generating module
    generates static update data and dynamic update data, the static update data being for displaying a section statically updated on the browser screen, the dynamic update data being for displaying a section dynamically updated on the browser screen, and
    outputs the static update data and the dynamic update data as full-screen display data,
  the determining module
    determines whether or not the second format is specified by the parameter of the HTTP request received by the Web server module,
    if the second format is specified, calls the data converting module, and
    if the second format is not specified, calls the HTML generating module,
  the data converting module
    converts the full-screen display data into the second format, and
    outputs the converted data,
  the template module supplies, to the HTML generating module, layout information of a Web page to be included in the HTTP response of the first format,
  the HTML generating module outputs data of the Web page of the first format by using the full-screen display data and the layout information, and
  the Web server module replies, in response to the HTTP request received from the Web browser module, depending on the parameter in the received HTTP request, as the HTTP response,
    the data of the Web page of the first format output by the HTML generating module, or
    the full-screen display data of the second format output by the data converting module.

According to an embodiment of the present disclosure, there is provided an information processing method of an information processing system including a Web server and a Web browser, the information processing method including:
  by a full-screen display interface of the Web browser, sending an HTTP request to the Web server, the HTTP request specifying a first format with a parameter, and displaying a full-screen of a browser screen in response to a received HTTP response of the first format;
  by a dynamic-updated part updating interface of the Web browser, sending an HTTP request to the Web server, the HTTP request specifying a second format with a parameter, and dynamically updating at least a part of the browser screen based on a received HTTP response of the second format;
  by a full-screen display data generating module of the Web server,
    generating static update data and dynamic update data, the static update data being for displaying a section statically updated on the browser screen, the dynamic update data being for displaying a section dynamically updated on the browser screen, and
    outputting the static update data and the dynamic update data as full-screen display data;
  by a determining module of the Web server,
    determining whether or not the second format is specified by the parameter of the HTTP request received by a Web server module,
    if the second format is specified, calling a data converting module, and
    if the second format is not specified, calling an HTML generating module;
  by the data converting module of the Web server,
    converting the full-screen display data into the second format, and outputting the converted data;
by a template module of the Web server, supplying, to the HTML generating module, layout information of a Web page to be included in the HTTP response of the first format;
by the HTML generating module of the Web server, outputting data of the Web page of the first format by using the full-screen display data and the layout information; and
by the Web server module of the Web server, replying, in response to the HTTP request received from the Web browser, depending on the parameter in the received HTTP request, as the HTTP response,
the data of the Web page of the first format output by the HTML generating module, or
the full-screen display data of the second format output by the data converting module.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Figure 1:
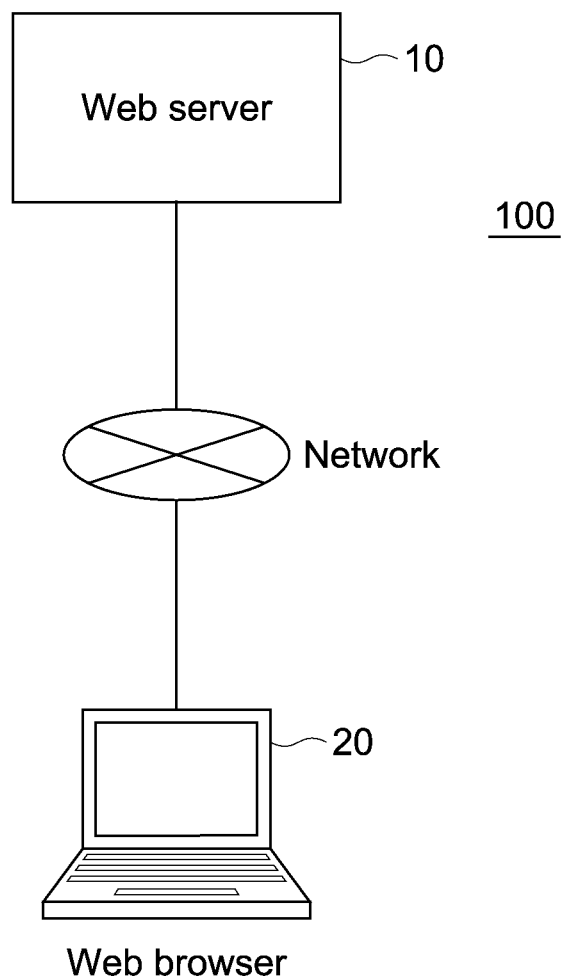
FIG. 1 shows an entire configuration of the information processing system 100 according to an embodiment of the present disclosure.
Figure 2:
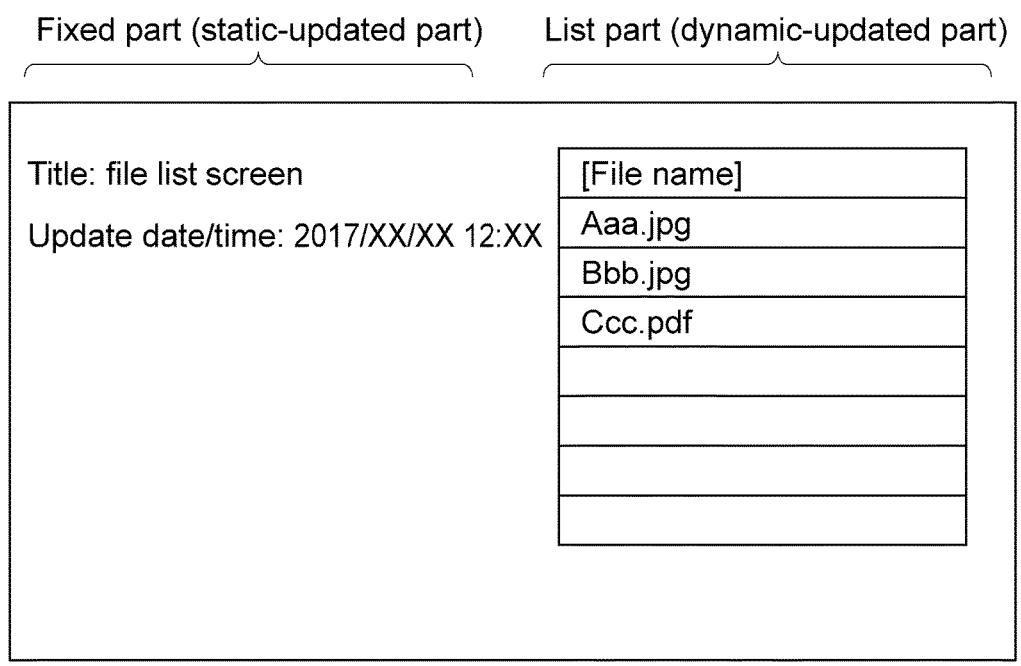
FIG. 2 shows an example of a browser screen displayed on a display device of the Web browser 20.

Hereinafter, an embodiment of the present disclosure will be described with reference to the drawings.
[Entire Configuration]
Firstly, an entire configuration of the information processing system 100 according to an embodiment of the present disclosure will be described. FIG. 1 shows an entire configuration of the information processing system 100 according to an embodiment of the present disclosure.
The information processing system 100 includes the Web server 10 and the Web browser 20 connected to each other via a network. Examples of each of the Web server 10 and the Web browser 20 include a personal computer (PC), a mobile terminal device such as a smartphone, an image forming apparatus such as a multifunction peripheral (MFP), and the like. Note that the Web server 10 and the Web browser 20 may execute socket communication, and may be embedded and built in an image forming apparatus.
The Web server 10 returns an HTTP (Hypertext Transfer Protocol) response to an HTTP request sent from the Web browser 20. Such a Web application is structured.
An entire configuration of the information processing system 100 according to an embodiment of the present disclosure has been described above.
[Example of Screen of Web Browser]
Next, an example of a browser screen displayed on a display device of the aforementioned Web browser 20 will be described. FIG. 2 shows an example of a browser screen displayed on a display device of the Web browser 20.

Figure 3:
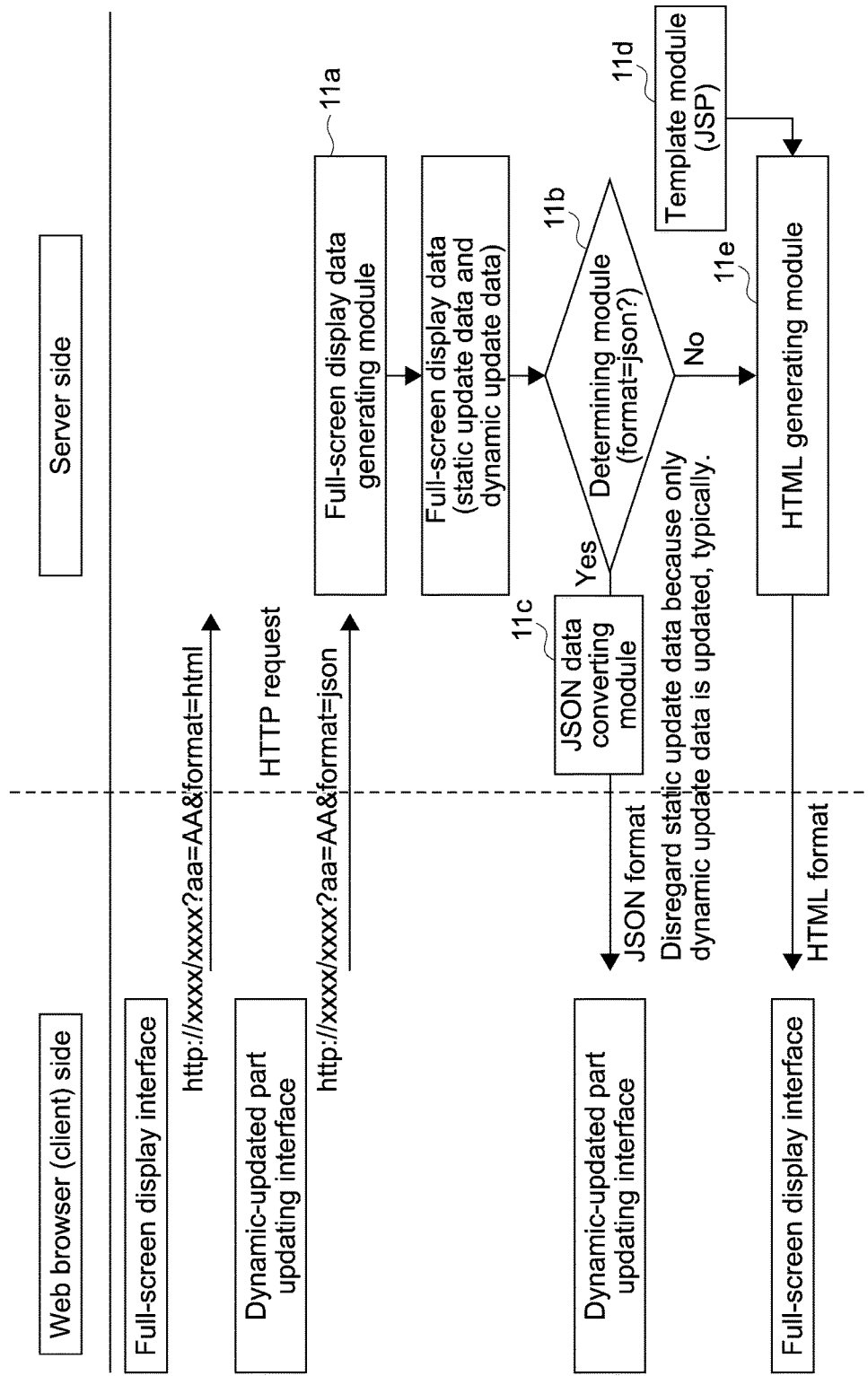
FIG. 3 shows an example of configuration of a Web application for dynamically updating a part of a browser screen according to a technology of the present embodiment.

The left side of the browser screen including the "Title: file list screen" part and the "Update date/time: 2017/XX/XX 12:XX" part will be referred to as a fixed part (static-updated part).
Further, the right side of the browser screen including the part of specific file names (Aaa.jpg, Bbb.jpg, Ccc.pdf) below "File name" will be referred to as a list part (dynamic-updated part).
Firstly, the static-updated part and the dynamic-updated part are rendered by using HTML data for full-screen display obtained from the Web server 10.
Further, only the dynamic-updated part is updated, partly, by using Ajax (Asynchronous JavaScript+XML). Note that, in this example, the file names displayed in the list part are the names of the files stored in the Web server 10. Since files are deleted or generated, the names of the files displayed on the list change dynamically.
Note that, in this example, the Web server 10 supplies data of the dynamic-updated part of the the JSON format to the Web browser 20.
An example of a browser screen displayed on a display device of the Web browser 20 has been described above.
[Configuration of Typical Technology]
Next, an example of configuration of a Web application for dynamically updating a part of a browser screen by using a typical technology will be described.
Firstly, a full-screen display interface of a Web browser sends an HTTP request to a Web server. A full-screen display HTML generating module of the Web server generates full-screen display HTML data, and replies the full-screen display HTML data to the Web browser as an HTTP response.
Next, a dynamic-updated part updating interface of the Web browser sends, to the Web server, an HTTP request to obtain data displayed in a dynamic-updated area. A dynamic-updated part updating JSON data generating module of the Web server replies an HTTP response of the JSON format.
As described above, according to the typical technology, a Web application programmer has to create a program of the full-screen display HTML generating module for replying an HTTP response of the HTML format, and a program of the dynamic-updated part updating JSON data generating module for replying an HTTP response of the JSON format for the Web server, which is burdensome for the Web application programmer.
An example of configuration of a Web application for dynamically updating a part of a browser screen by using a typical technology has been described above.
[Configuration of Technology of Present Embodiment]
Next, an example of configuration of a Web application for dynamically updating a part of a browser screen according to a technology of the present embodiment will be described. FIG. 3 shows an example of configuration of a Web application for dynamically updating a part of a browser screen according to a technology of the present embodiment.
Firstly, the full-screen display interface of the Web browser sends an HTTP request to the Web server. At this time, the full-screen display interface specifies "format=html" as a parameter of the HTTP request.
The Web server receives the HTTP request. The full-screen display data generating module 11a generates full-screen display data (including static update data and dynamic update data). The determining module 11b determines that the JSON format (second format) is not specified as a parameter. Based on the layout information obtained from the template module (actually, JSP (Java Server Pages)) 11d, the HTML generating module 11e generates full-screen display data of the HTML format (first format). The HTML generating module 11e replies the full-screen display data as an HTTP response to the full-screen display interface of the Web browser.

Next, the dynamic-updated part updating interface of the Web browser sends an HTTP request to update the dynamic-updated part to the Web server. At this time, the dynamic-updated part updating interface specifies "format=json" as a parameter of an HTTP request.

The Web server receives the HTTP request. The full-screen display data generating module 11a generates full-screen display data (including static update data and dynamic update data). The determining module 11b determines that the JSON format (second format) is specified as a parameter. The JSON data converting module 11c converts the full-screen display data into the JSON format. The JSON data converting module 11c replies the converted data as an HTTP response to the dynamic-updated part updating interface of the Web browser.

The dynamic-updated part updating interface receives the full-screen display data of the JSON format as an HTTP response. Then the dynamic-updated part updating interface disregards the static update data in the full-screen display data. The dynamic-updated part updating interface executes dynamic updating by using the dynamic update data.

According to the technology of the present embodiment, the determining module 11b, the JSON data converting module 11c, and the HTML generating module 11e are fixed framework modules. The fixed framework modules are not modified after they are structured once. Such fixed framework modules are supplied.

When a Web application programmer creates the modules of the present embodiment, the programmer may flexibly modify only the full-screen display data generating module 11a and the template module 11d as business logics depending on the specs of Web applications.

As described above, the HTML format output module and the JSON format output module are pre-supplied as the frameworks. Therefore a Web application programmer may create or modify only one business logic module, which may be less burdensome in programming.

An example of configuration of a Web application for dynamically updating a part of a browser screen according to a technology of the present embodiment has been described above.

[Configuration of Web Server]

Figure 4:
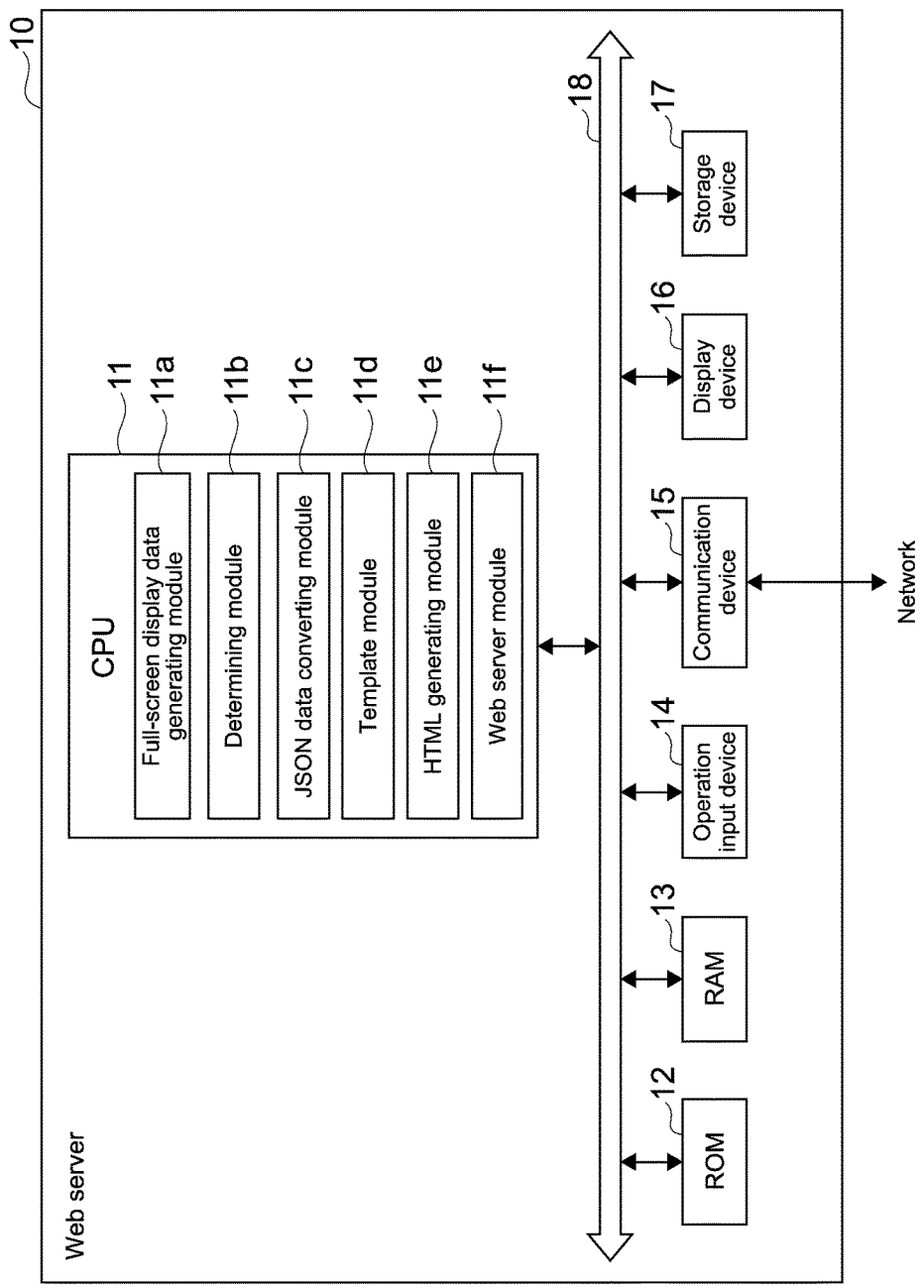
FIG. 4 shows a block configuration of the Web server 10.

Next, a configuration of the Web server 10 will be described. The management server 10 may include dedicated hardware or software or a general-purpose computer. FIG. 4 shows a block configuration of the Web server 10.

As shown in FIG. 4, the Web server 10 includes a CPU (Central Processing Unit) 11, a ROM (Read Only Memory) 12, a RAM (Random Access Memory) 13, an operation input device 14, a communication device 15 (second communication device), a display device 16, a storage device 17, and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, and various types of data.

The communication device 15 is connected to a network for sending/receiving information to/from the Web browser 20.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 of the Web server 10 executes a program, the CPU 11 operates as the functional blocks described below.

The functional blocks that the CPU 11 of the Web server 10 realizes are the full-screen display data generating module 11a, the determining module 11b, the JSON data converting module 11c (data converting module), the template module 11d, the HTML generating module 11e, and the Web server module 11f.

The full-screen display data generating module 11a generates static update data and dynamic update data, the static update data being for displaying a section statically updated on the browser screen, the dynamic update data being for displaying a section dynamically updated on the browser screen, and outputs the static update data and the dynamic update data as full-screen display data.

The determining module 11b determines whether or not "format=j son" is specified by the parameter of the HTTP request received by the Web server module 11f, if "format=json" is specified, calls the JSON data converting module 11c, and if "format=json" is not specified, calls the HTML generating module 11e.

The data converting module 11c converts the full-screen display data into the JSON format.

The template module 11d is structured in the JSP or the like. The template module 11d has layout information of a Web page as a template. The template module 11d supplies, to the HTML generating module 11e, the layout information.

The HTML generating module 11e generates data of the Web page of the HTML format by using the full-screen display data output from the full-screen display data generating module 11a and the layout information obtained from the template module 11d.

The Web server module 11f replies, in response to the HTTP request received from the Web browser, depending on the parameter in the received HTTP request, as the HTTP response, the data of the Web page of the HTML format generated by the HTML generating module 11e, or the full-screen display data of the JSON format converted by the JSON data converting module 11c.

A configuration of the Web server 10 has been described above.

[Configuration of Web Browser]

Figure 5:
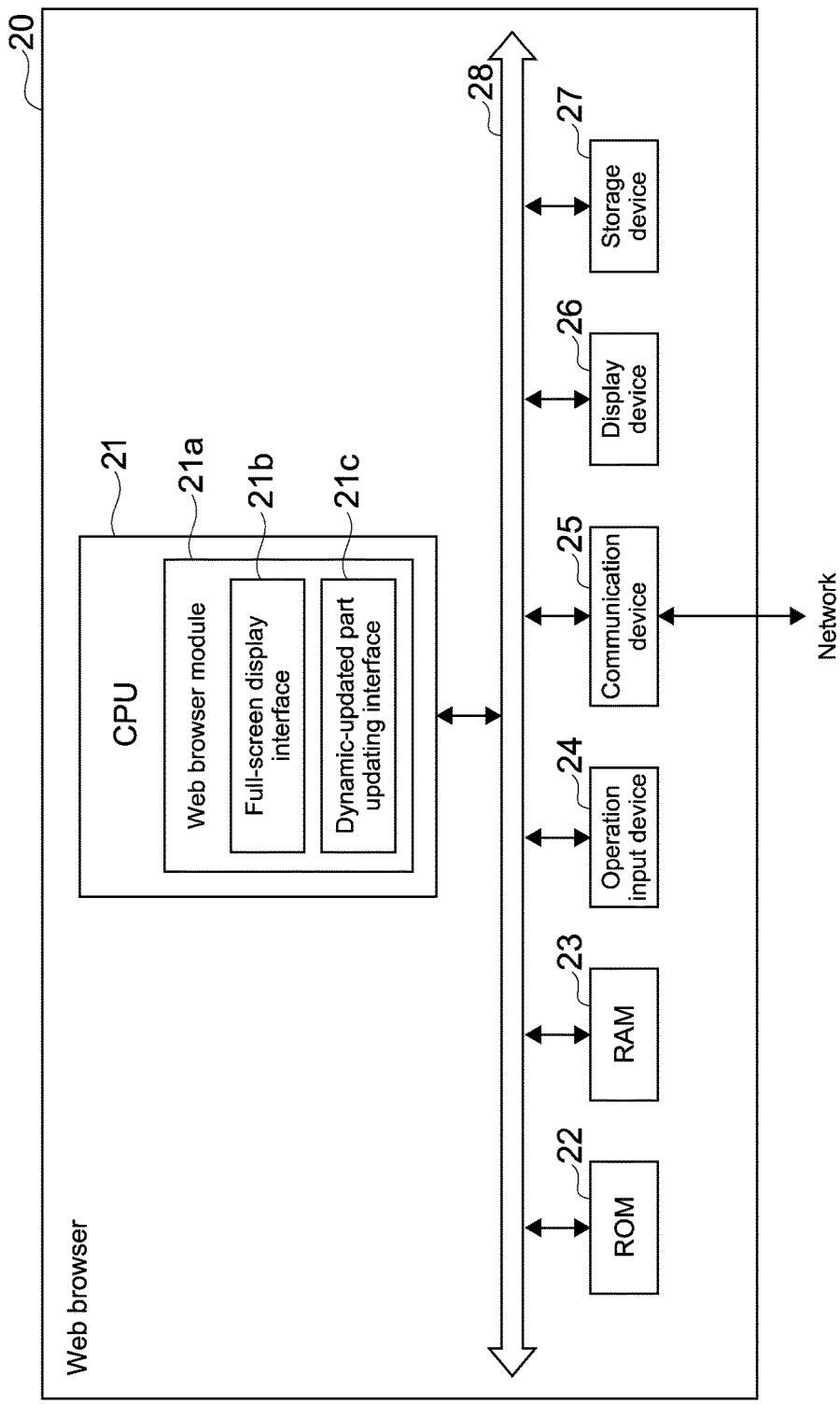
FIG. 5 shows a block configuration of the Web browser 20.

Next, a configuration of the Web browser 20 will be described. The management server 20 may include dedicated hardware or software or a general-purpose computer. FIG. 5 shows a block configuration of the Web browser 20.

As shown in FIG. 5, the Web browser 20 includes a CPU (Central Processing Unit) 21, a ROM (Read Only Memory)

22, a RAM (Random Access Memory) 23, an operation input device 24, a communication device 25 (first communication device), a display device 26, a storage device 27, and these blocks are connected to each other via a bus 28.

The ROM 22 stores a plurality of programs such as firmware for executing various types of process, and data. The RAM 23 is used as a work area of the CPU 21 and temporarily stores an OS (Operating System), various applications being executed, and various types of data being processed.

The storage device 27 is, for example, an HDD (Hard Disk Drive), a flash memory, or other nonvolatile memories. The storage device 27 stores the OS, various applications, and various types of data.

The communication device 25 is connected to a network for sending/receiving information to/from the Web server 10.

Of the plurality of programs stored in the ROM 22 or the storage device 27, the CPU 21 loads a program in the RAM 23 in response to a command input via the operation input device 24, and appropriately controls the display device 26 and the storage device 27 according to the loaded program.

The operation input device 24 is, for example, a pointing device such as a mouse, a keyboard, a touch panel, or other operation devices.

The display device 26 is, for example, a liquid crystal display, an EL (Electro-Luminescence) display, or a plasma display.

Next, functional blocks will be described. When the CPU 21 of the Web browser 20 executes a program, the CPU 21 operates as the functional blocks described below.

The functional block that the CPU 21 of the Web browser 20 realizes is the Web browser module 21a.

The Web browser module 21a includes the full-screen display interface 21b and the dynamic-updated part updating interface 21c.

The full-screen display interface 21b sends the HTTP request with the "format=html" parameter to the Web server module 11f. Further, the full-screen display interface 21b interprets the Web page data of the HTML format received from the Web server module 11f. The full-screen display interface 21b displays the full-screen including the static-updated part and the dynamic-updated part on the browser screen.

In other words, the full-screen display interface 21b sends an HTTP request to the Web server 10, the HTTP request specifying the HTML format with a parameter, and displays a full-screen of a browser screen in response to a received HTTP response of the HTML format.

The dynamic-updated part updating interface 21c sends the HTTP request with the "format=j son" parameter to the Web server module 11f. Further, the dynamic-updated part updating interface 21c interprets the Web page data of the JSON format received from the Web server module 11f, and disregards the static update data. The dynamic-updated part updating interface 21c updates the dynamic-updated part on the browser screen based on the dynamic update data.

In other words, the dynamic-updated part updating interface 21c sends an HTTP request to the Web server 10, the HTTP request specifying the JSON format with a parameter, and dynamically updates at least a part of the browser screen based on a received HTTP response of the JSON format.

A configuration of the Web browser 20 has been described above.

[Processing Flow of Web Server]

Figure 6:
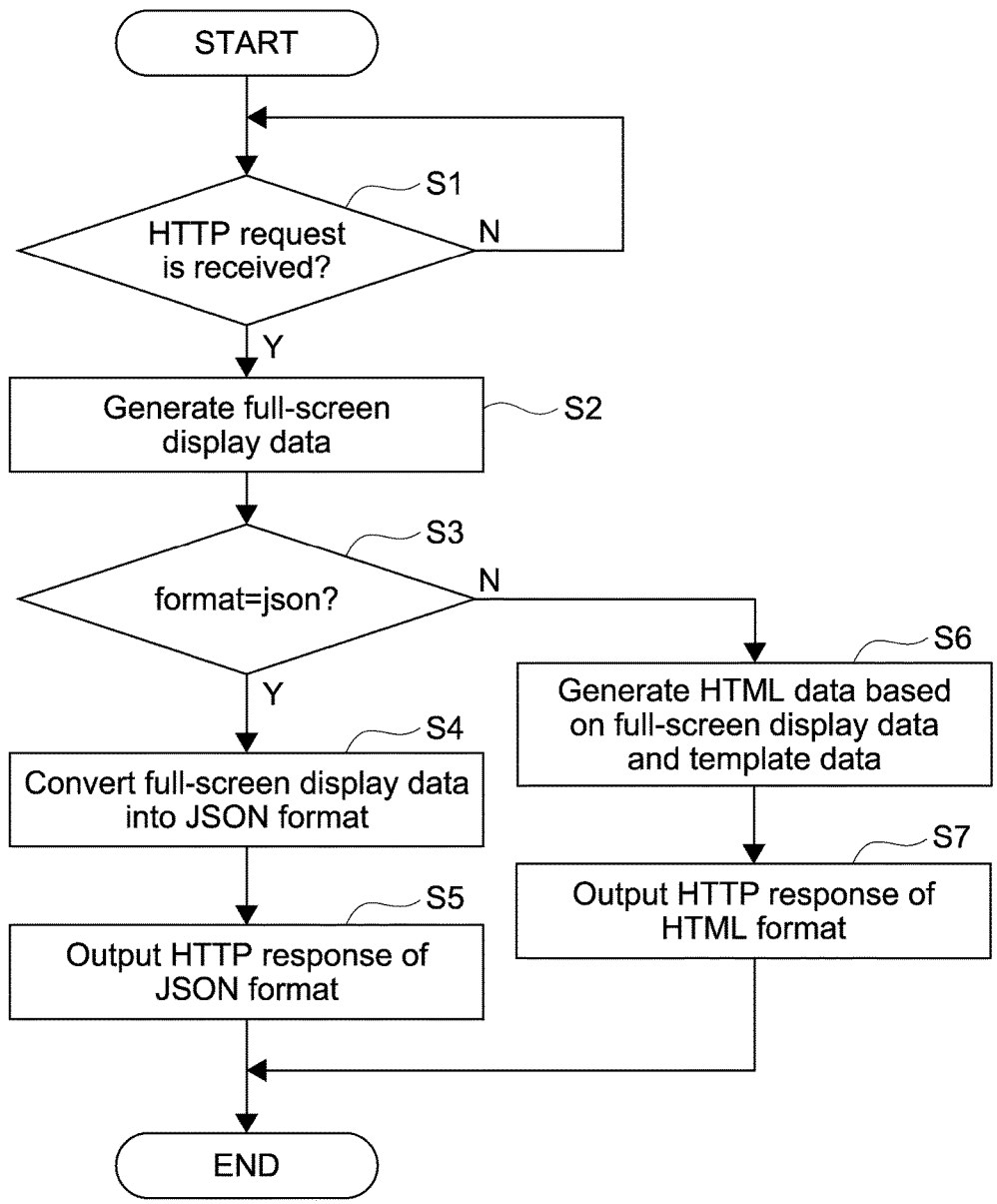
FIG. 6 shows a processing flow of the Web server 10.

Next, a processing flow of the Web server 10 will be described. FIG. 6 shows a processing flow of the Web server 10.

Firstly, the Web server module 11f determines whether or not an HTTP request is received from the Web browser (Step S1).

If no HTTP request is received (Step S1, N), the Web server module 11f returns to Step S1 and stands by.

If an HTTP request is received (Step S1, Y), next, the full-screen display data generating module 11a generates full-screen display data (including static update data and dynamic update data) (Step S2).

Next, the determining module 11b determines whether or not "format=j son" is specified with a parameter of the HTTP request (Step S3).

If "format=json" is specified (Step S3, Y), next, the JSON data converting module 11c converts the full-screen display data into the JSON format (Step S4).

Next, the Web server module 11f replies the full-screen display data, which is converted into the JSON format, to the Web browser as an HTTP response (Step S5).

If "format=j son" is not specified (Step S3, N), next, the HTML generating module 11e generates Web page data of the HTML format based on the full-screen display data and the layout information from the template module 11d (Step S6).

Next, the Web server module 11f replies the Web page data of the HTML format to the Web browser as an HTTP response (Step S7).

A processing flow of the Web server 10 has been described above.

Effects

Let's say that elements are added to an installed Web application or specs of the installed Web application are modified as follows. According to the present embodiment, the amount of required modification of codes and the number of modified codes are small to support such addition or modification. Therefore it is possible to flexibly support the Web application.

Examples of cases where addition of elements and modification of specs are required are as follows.
(1) Case where a Web service of the JSON format is required.
(2) Case where execution of scraping is required.
(3) Case where a part of a browser screen is updated in association with modification of data of a Web server side Modification Example According to the aforementioned embodiment, if "html" is specified as the parameter "format" specified in an HTTP request, an HTTP response of the HTML format is replied. The present disclosure is not limited to the aforementioned embodiment. An HTTP response of the HTML format may be replied where the "format" parameter is omitted.

According to this configuration, an HTTP response of the HTML format is obtained without specifying "format=html".

CONCLUSION

According to a typical Web application, for example, in order to dynamically update a part of a statically-updated full-screen on a browser screen that a Web browser displays, it is necessary to install, in a Web server side, both a program that supports static updating and a program that supports dynamic updating.

More specifically, it is necessary to create and install two programs individually, which is burdensome for a programmer. One is a program (Java Servlet, Java is registered trademark) for generating data of the HTML (Hyper Text Markup Language) format, which is used for static updating. The other is a program for generating data of the JSON (JavaScript Object Notation) format, which is used for easily interpreting data displayed on, for example, a list part dynamically updated.

To the contrary, according to the information processing system 100 of the present embodiment, the determining module 11b, the JSON data converting module 11c, and the HTML generating module 11e are fixed framework modules. The fixed framework modules are not modified after they are structured once. Such fixed framework modules are supplied.

When a Web application programmer creates the modules of the present embodiment, the programmer may flexibly modify only the full-screen display data generating module 11a and the template module 11d as business logics depending on the specs of Web applications.

As described above, the HTML format output module and the JSON format output module are pre-supplied as the frameworks. Therefore a Web application programmer may create or modify only one business logic module, which may be less burdensome in programming.

Therefore data that supports two formats is generated without difficulties.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
   a Web server; and
   a Web browser connected to the Web server via a network,
   the Web browser including
      a first communication device communicable with the Web server, and
      a Web browser module,
   the Web browser module including
      a full-screen display interface that sends an HTTP request to the Web server, the HTTP request specifying a first format with a parameter, and displays a full-screen of a browser screen in response to a received HTTP response of the first format, and
      a dynamic-updated part updating interface that sends an HTTP request to the Web server, the HTTP request specifying a second format with a parameter, and dynamically updates at least a part of the browser screen based on a received HTTP response of the second format,
   the Web server including
      a second communication device communicable with the Web browser,
      a full-screen display data generating module,
      a determining module,
      a data converting module,
      a template module,
      an HTML generating module, and
      a Web server module, wherein
   the full-screen display data generating module
      generates static update data and dynamic update data, the static update data being for displaying a section statically updated on the browser screen, the dynamic update data being for displaying a section dynamically updated on the browser screen, and
      outputs the static update data and the dynamic update data as full-screen display data,
   the determining module
      determines whether or not the second format is specified by the parameter of the HTTP request received by the Web server module,
      if the second format is specified, calls the data converting module, and
      if the second format is not specified, calls the HTML generating module,
   the data converting module
      converts the full-screen display data into the second format, and
      outputs the converted data,
   the template module supplies, to the HTML generating module, layout information of a Web page to be included in the HTTP response of the first format,
   the HTML generating module outputs data of the Web page of the first format by using the full-screen display data and the layout information, and
   the Web server module replies, in response to the HTTP request received from the Web browser module, depending on the parameter in the received HTTP request, as the HTTP response,
      the data of the Web page of the first format output by the HTML generating module, or
      the full-screen display data of the second format output by the data converting module.

2. The information processing system according to claim 1, wherein
   the first format is HTML format.

3. The information processing system according to claim 1, wherein
   the second format is JSON format.

4. An image forming apparatus, comprising:
   a Web server; and
   a Web browser,
   the Web browser including
      a first communication device communicable with the Web server, and
      a Web browser module,
   the Web browser module including
      a full-screen display interface that sends an HTTP request to the Web server, the HTTP request specifying a first format with a parameter, and displays a full-screen of a browser screen in response to a received HTTP response of the first format, and
      a dynamic-updated part updating interface that sends an HTTP request to the Web server, the HTTP request specifying a second format with a parameter, and dynamically updates at least a part of the browser screen based on a received HTTP response of the second format,
   the Web server including
      a second communication device communicable with the Web browser,
      a full-screen display data generating module,
      a determining module,
      a data converting module,
      a template module,
      an HTML generating module, and
      a Web server module, wherein the full-screen display data generating module
generates static update data and dynamic update data, the static update data being for displaying a section statically updated on the browser screen, the dynamic update data being for displaying a section dynamically updated on the browser screen, and
outputs the static update data and the dynamic update data as full-screen display data,
the determining module
determines whether or not the second format is specified by the parameter of the HTTP request received by the Web server module,
if the second format is specified, calls the data converting module, and
if the second format is not specified, calls the HTML generating module,
the data converting module
converts the full-screen display data into the second format, and
outputs the converted data,
the template module supplies, to the HTML generating module, layout information of a Web page to be included in the HTTP response of the first format,
the HTML generating module outputs data of the Web page of the first format by using the full-screen display data and the layout information, and
the Web server module replies, in response to the HTTP request received from the Web browser module, depending on the parameter in the received HTTP request, as the HTTP response,
the data of the Web page of the first format output by the HTML generating module, or
the full-screen display data of the second format output by the data converting module.

5. An information processing method of an information processing system including a Web server and a Web browser, the information processing method comprising:

by a full-screen display interface of the Web browser, sending an HTTP request to the Web server, the HTTP request specifying a first format with a parameter, and displaying a full-screen of a browser screen in response to a received HTTP response of the first format;

by a dynamic-updated part updating interface of the Web browser, sending an HTTP request to the Web server, the HTTP request specifying a second format with a parameter, and dynamically updating at least a part of the browser screen based on a received HTTP response of the second format;

by a full-screen display data generating module of the Web server,
generating static update data and dynamic update data, the static update data being for displaying a section statically updated on the browser screen, the dynamic update data being for displaying a section dynamically updated on the browser screen, and
outputting the static update data and the dynamic update data as full-screen display data;

by a determining module of the Web server,
determining whether or not the second format is specified by the parameter of the HTTP request received by a Web server module,
if the second format is specified, calling a data converting module, and
if the second format is not specified, calling an HTML generating module;

by the data converting module of the Web server,
converting the full-screen display data into the second format, and
outputting the converted data;

by a template module of the Web server, supplying, to the HTML generating module, layout information of a Web page to be included in the HTTP response of the first format;

by the HTML generating module of the Web server, outputting data of the Web page of the first format by using the full-screen display data and the layout information; and by the Web server module of the Web server, replying, in response to the HTTP request received from the Web browser, depending on the parameter in the received HTTP request, as the HTTP response,
the data of the Web page of the first format output by the HTML generating module, or
the full-screen display data of the second format output by the data converting module.

\* \* \* \* \*